May 29, 1956     C. L. COYNE, JR., ET AL     2,747,961
FIXTURE FOR ADJUSTING THE CATHODE OF AN ELECTRONIC TUBE
Filed Oct. 1, 1953     2 Sheets-Sheet 1

Inventors:
C. L. Coyne, Jr.
G. A. Mitchell
By C. A. Hamilton, Atty.

May 29, 1956  C. L. COYNE, JR., ET AL  2,747,961
FIXTURE FOR ADJUSTING THE CATHODE OF AN ELECTRONIC TUBE
Filed Oct. 1, 1953  2 Sheets-Sheet 2
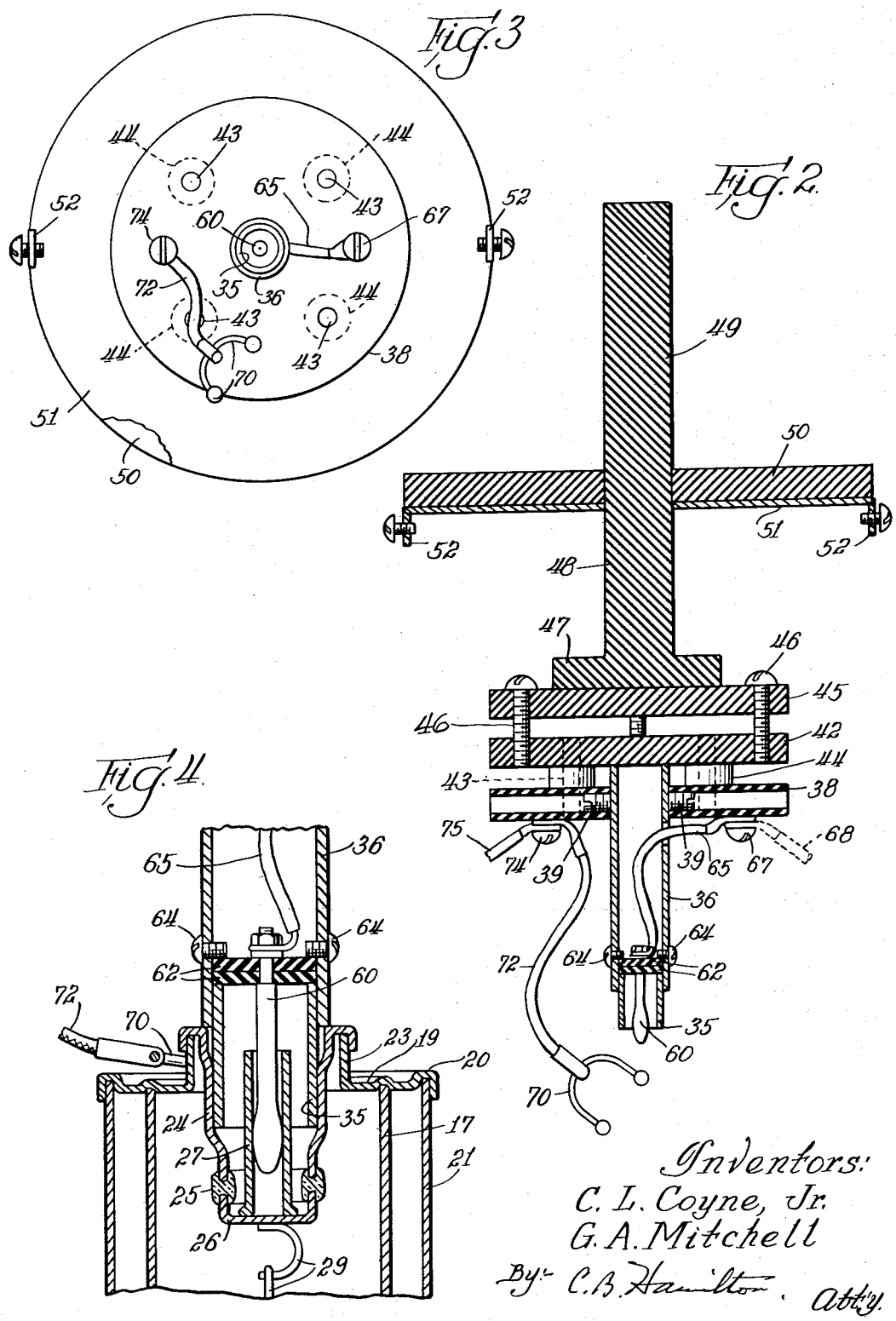
Inventors:
C. L. Coyne, Jr.
G. A. Mitchell
By: C. B. Hamilton, Atty.

United States Patent Office 2,747,961
Patented May 29, 1956

2,747,961

FIXTURE FOR ADJUSTING THE CATHODE OF AN ELECTRONIC TUBE

Cornelius L. Coyne, Jr., Aurora, Ill., and Gerald A. Mitchell, White Bear Lake, Minn., assignors to Western Electric Company, Incorporated, New York, N. Y., a corporation of New York Application October 1, 1953, Serial No. 383,682

8 Claims. (Cl. 316—27)

This invention relates to a fixture for adjusting the cathode of an electronic tube while it is being tested under operating conditions to increase its efficiency and avoid rejections and more particularly to a fixture for establishing electrical connections to the cathode of a magnetron and for adjusting the cathode while the magnetron is being aged and tested.

In the manufacture of magnetron tubes for generating high frequency oscillations, after a tube is fabricated it is placed in a testing apparatus to determine if its operation is satisfactory and to age the tube in order to overcome the intermittent arcing encountered in a new tube during the initial period of operation thereof. The cathode of the tube is connected to a pulsing circuit for supplying pulses of high voltage current thereto to cause the magnetron tube to oscillate and the output of the magnetron tube is connected to that portion of the testing apparatus for measuring it to ascertain its frequency and power output. When arcing occurs in the tube the high voltage of the pulsing current supplied thereto is reduced to suppress the arc and after the arc is suppressed, the voltage is again raised to a predetermined high value. This aging and testing operation continues until the intermittent arcing ceases in the magnetron tube. During the testing and aging of the magnetrons some are found to be defective and ordinarily would be rejected as unfit for use. However, it has been found that some of the rejected magnetron tubes can be salvaged by adjusting the position of the cathode of the tube relative to the anode during the testing and aging operation.

It is an object of the present invention to provide a manually actuated fixture applicable to a magnetron for adjusting the position of the cathode and electrically connecting it to a pulsing circuit during the testing and aging of the magnetron and which fixture affords protection for the operator against the heat and high voltage associated therewith.

The invention contemplates the provision of an elongated handle of insulating material rigidly secured to a metal tube and provided with a plurality of discs of insulating material and a metal disc connected to ground potential for shielding the operator from the heat and high voltages encountered in adjusting the cathode of the tube during the aging and testing operation. A pair of electrical connectors are carried by the fixture and are connectible to a pulsing circuit, whereby when the fixture is applied to a magnetron, the connectors engage parts of the magnetron to electrically connect the heater and cathode to said circuit. The end of the metal tube of the fixture fits into a socket in the cathode supporting member of a magnetron which has been rejected and while it is being tested and aged, whereby in response to lateral movement of the handle the metal tube is tilted to cause the cathode supporting member to be tilted and the cathode to be laterally adjusted relative to the anode of the tube, which adjusting operation will continue until a position is found which provides satisfactory and efficient operation of the magnetron as indicated on the testing apparatus associated therewith.

Other objects and advantages of the invention will become apparent by reference to the following detailed description and the accompanying drawings illustrating a preferred embodiment thereof, in which Fig. 1 is a side elevational view of a magnetron being tested and showing the fixture in operative relation thereto;

Fig. 2 is a vertical sectional elevational view of the fixture;

Fig. 3 is a bottom view of the fixture, and

Fig. 4 is an enlarged sectional view through a portion of the fixture and the magnetron in operative position.

Figure 1:
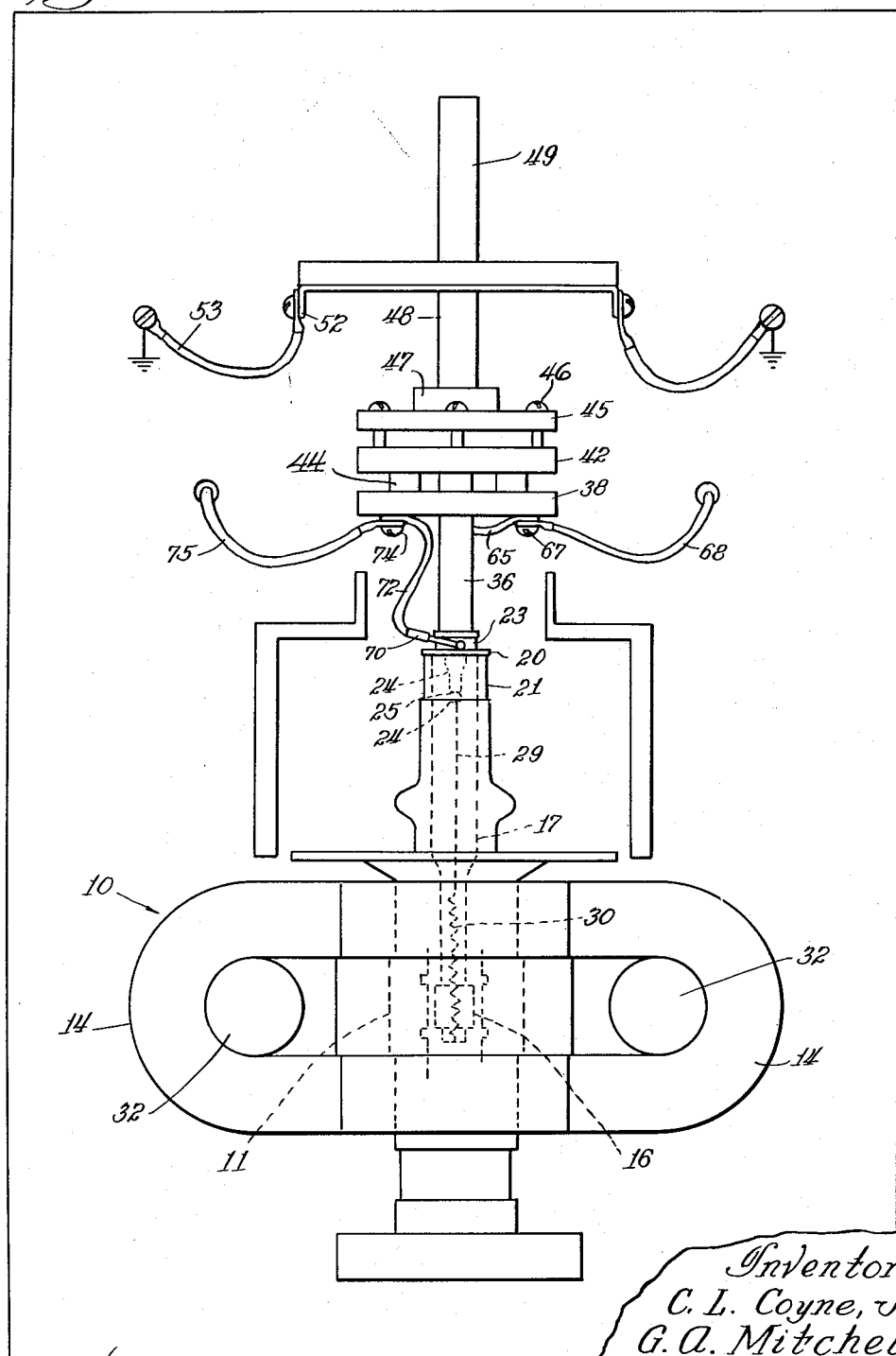

Referring to the drawings the fixture 5 is designed to facilitate the salvaging of magnetrons found to be defective during the testing and aging thereof and the fixture is adapted to be applied to the cathode supporting member of a defective magnetron to electrically connect the cathode of the magnetron into a pulsing circuit for heating the cathode and supplying pulses of high voltage current thereto and to establish a physical connection with a portion of the cathode supporting member, whereby in response to the manual tilting movement of the fixture the cathode may be laterally adjusted relative to the anode to a position where the magnetron functions satisfactorily. The magnetron 10 comprises a body member 11 (Fig. 1) forming a hollow anode 12 and having a pair of pole pieces 13 on opposite ends thereof to which are secured permanent horseshoe magnets 14. A cathode 16 centrally disposed in the hollow anode is supported on the lower end portion of a hollow cathode supporting member or stem 17, which at the upper end thereof is brazed to an annular member or cap 20 (Fig. 4). The cap 20 forms a part of the cathode supporting member 17 and is brazed to an annular shell 21 which is bonded to a glass sleeve 22 and together therewith forms a part of an envelope enclosing a portion of the cathode supporting member 17 and extending from one of the pole pieces 13. The annular member 20 has a tubular neck portion 23 which is brazed to one end of a tubular terminal member 24, the lower end of which is bonded to a glass ring 25. A metal cup 26 is also bonded to the glass ring 25 and has a tubular metal member or jack 27 brazed thereto in spaced and insulated relation to the walls of the member 24. A lead 29 from the cup 26 is connected to one end of a cathode heating coil 30 which is electrically connected to the cathode, the other end of the coil being electrically connected to the hollow cathode stem 17 which is electrically connected to the annular terminal member 24. During the normal testing and aging of the magnetron the jack 27 and the terminal member 24 are engaged by connector means for electrically connecting the heating coil 30 and the cathode to a circuit for supplying a low voltage current to the coil 30 and a high voltage pulsing current to the cathode. In Fig. 1 a defective magnetron tube is shown supported in testing position on a pair of rods 32 of a testing apparatus 33 with the cathode adjusting fixture applied thereto and with the anode 13 grounded to the apparatus.

The fixture 5 at its lower end has a bending member in the form of a sleeve 35 which is secured to and within a metal tube 36 and extends a predetermined distance from one end thereof. The tube 36 is secured in a central aperture 37 of a disc of insulating material 38 by a plurality of set screws 39. The end of the tube 36 abuts against a disc 42 of insulating material which is secured to the disc 38 by a plurality of threaded members 43 and is maintained in spaced relation thereto by a plurality of spacers 44 of insulating material surrounding the threaded member and bonded to the discs 38 and 42. A third disc 45 of insulating material is secured to the disc 42 by a plurality of threaded members 46 and the flanged end 47 of a rod 48 of insulating material is secured to the disc 45. The outer end of the rod forms a handle 49 which is protected by a disc of insulating material 50 to the underneath side of which a thin metal disc 51 is secured. The disc 51 is provided with one or more terminal lugs 52 to which one end of conductor leads 53 are connected, the other ends of which are connected to suitable ground connections on the testing apparatus 33 for grounding the disc 51.

The handle 49 may be grasped by the operator and the fixture applied to the magnetron with the sleeve 35 in telescoping engagement with the tubular terminal member 24 and with the lower end of the metal tube 36 resting on the upper end of the tubular terminal member 24 as shown in Fig. 4, whereby the handle 49 of the fixture may be moved laterally to effect a tilting or bending movement of the fixture to bend portions of the cap 20 and cause the cathode supporting stem 17 to pivotally move about its upper end and thereby effect a lateral adjustment of the cathode 16 to a different position within the hollow anode 12.

Means are provided on the fixture for electrically connecting the heating coil 30 and cathode of the magnetron to the pulsing circuit during the testing of the magnetron. A connector member or pin 60 adapted to fit within the jack 27 and establish an electrical connection therewith is centrally secured to a pair of washers 62 of flexible insulating material which are supported on the upper end of the sleeve 35 within the tube 36 and are retained in position by a pair of screws 64. The pin 60 is connected to one end of an insulated conductor lead 65, which extends upwardly through the tube 36 and outwardly through an aperture therein and is connected to a terminal 67 on the lower disc 38. A lead 68 from the pulsing circuit is connectible to the terminal 67 to electrically connect the pin 60 and one end of the heating coil 30 thereto. An electrical connector member in the form of a U-shaped terminal clip 70 is adapted to be pressed around and into engagement with the tubular neck portion 23 of the cap 20 and the connector member 70 is connected to a conductor lead 72, which is connected to a terminal 74 on the disc 38. A lead 75 from the pulsing circuit is connectible to the terminal 74 to complete a circuit to the heating coil 30 and the cathode 16 and over which circuit a low voltage heating current is supplied to the heating coil and high voltage pulses are supplied to the cathode.

During the aging and testing of the magnetrons, when a defective one is found, the regular electrical connector members from the pulsing circuit are removed from the magnetron and the leads 68 and 75, and the fixture 5 is applied thereto with the sleeve 35 of the fixture in telescoping engagement with the tubular terminal 24 of the magnetron and with the connector pin 60 of the fixture in engagement with the jack 27 of the magnetron. The terminal clip 70 is then connected to the neck portion 23 of the cathode supporting cap 20, after which the leads 68 and 75 of the pulsing circuit are connected to the terminals 67 and 74 of the fixture to electrically connect the cathode of the magnetron thereto. The leads 53 are also connected to ground potential. The testing and aging operation is then continued during which the operator moves the handle portion 49 of the fixture laterally in various directions and causes the tilting of the fixture about the lower end thereof, which tilting movement is imparted to the tubular terminal member 24, the central portions of the cap 20 and the stem portion 17 of the cathode to effect the lateral adjustment of the cathode 16 to a different position within the anode 12. The cathode is adjusted in this manner to various positions and the R. F. power and the frequency of the magnetron indicated on the testing apparatus enables the operator to ascertain if an improvement in operation of the defective magnetron tube is effected by the shifting of the cathode. The cathode supporting cap 20 is bent slightly during adjustment of the cathode and serves to support the cathode in its adjusted position. The spaced construction of the insulating discs 38, 39, 45, and 50, and the ground shield 51 on the disc 50 serve to insulate the handle 49 of the fixture 5 and the operator's hand from the heat and the high voltages encountered during the testing of the magnetron and the adjusting of the cathode. Thus, the fixture affords a high degree of safety and is readily applied to the magnetron and electrically connected to the pulsing circuit.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for manually adjusting the position of an internal member of an electronic tube during the operation thereof while observing the electrical characteristics of the tube during adjustment, comprising a handle of insulating material, a metal shield projecting laterally from a lower position of the handle and connectible to ground, a plurality of spaced insulators connected to the lower end of the handle, an adjusting means secured to the insulators for engaging the said member of the electronic tube to be adjusted, and means carried by the insulator for making electrical connections to the tube.

2. A fixture for adjusting the position of the cathode of an electronic tube during the testing thereof comprising an element adapted to fit into a socket of the cathode supporting part of the electronic tube for imparting bending and tilting movement thereto in response to tilting movement of the fixture, a handle of insulating material having a portion extending transversely therefrom to form a protective baffle therefor, means for securing said handle to said element in spaced and insulated relation thereto, and means on said fixture engageable with a portion of said electronic tube when said fixture is applied thereto and connectible to an electrical circuit for establishing an electrical connection between said circuit and said electronic tube.

3. A fixture for adjusting the position of the cathode of an electronic tube during the testing thereof comprising an element adapted to engage a cathode supporting part of the electronic tube for imparting locating movement thereto in response to movement of the fixture, a handle of insulating material having an annular portion extending transversely therefrom to form a protective baffle therefor, means for securing said handle to said element in spaced and insulated relation thereto, a conductor member connectible to ground potential, means for mounting said conductor member between said handle and said element for grounding potentials induced therein, and means on said fixture engageable with portions of said electronic tube when said fixture is applied thereto and connectible to an electrical circuit for establishing electrical connections between said circuit and said electronic tube.

4. A fixture for adjusting the position of the cathode of an electronic tube during the testing thereof comprising a tubular metal element adapted to fit into a socket of the cathode supporting part of the electronic tube for imparting bending and tilting movement thereto in response to tilting movement of the fixture, a handle of insulating material having an annular portion extending transversely therefrom to form a protective baffle therefor, means for securing said handle to said hollow element in spaced and insulated relation thereto, a sheet of metal fixed to said transversely extending portion of the handle and connectible to ground potential, and means including a connector member mounted in said tubular element in insulated relation thereto and engageable with a portion of said electronic tube when said fixture is applied thereto and connectible to a testing apparatus for establishing an electrical connection between said testing apparatus and said electronic tube.

5. A fixture for adjusting the position of the cathode of an electronic tube during the aging and testing thereof wherein the cathode is mounted on a cathode supporting member which is supported and has a socket at one end thereof comprising a tubular metal element adapted to fit into the socket of the cathode supporting member of the electronic tube for imparting bending and tilting movement thereto in response to tilting movement of the fixture, a handle of insulating material having an annular portion extending transversely therefrom to form a protective baffle therefor, means for securing said handle to said hollow element in spaced and insulated relation thereto, a conductor member connectible to a ground potential, means for mounting said conductor member between said element and said handle and adjacent said handle for grounding potentials induced in said conductor, a pair of terminals mounted in spaced and insulated relation to each other and said tubular element and electrically connectible to a testing apparatus, a connector element mounted within and at one end of said tubular member in insulated relation thereto and electrically connected to one of said terminals and engageable with a part of the electronic tube when the fixture is applied thereto for establishing an electrical connection between said apparatus and said part, and a connector clip electrically connected to the other terminal and engageable with another part of the electronic tube for establishing an electrical connection between said apparatus and said other part of the electronic tube.

6. A fixture for adjusting the position of the cathode of an electronic tube during the aging and testing thereof wherein the cathode is mounted on a cathode supporting member which is supported and has a socket at one end thereof comprising a bending member adapted to fit into the socket of the cathode supporting member of the tube for bending and tilting said member, and moving said cathode in response to tilting movement of the bending member, a plurality of discs of insulating material, means mounting said discs in coaxially aligned and axially spaced relation to each other, means for securing said bending member to an end one of said discs, a rod of insulating material fixed to the other end of one of said discs with the end portion of said rod forming a handle for said fixture, a circular flange of insulating material on said rod intermediate its ends forming a shield for said handle, a disc of metal secured to the side of said flange directed toward said discs and connectible to ground potential, and connector means mounted for movement with said bending member for making electrical connections between said cathode and a circuit for supplying current thereto.

7. A fixture for adjusting the position of the cathode of an electronic tube during the aging and testing thereof wherein the cathode is mounted on a cathode supporting member which is supported and has a socket at one end thereof comprising a metal tube having a reduced end portion thereof forming a shoulder, said end portion being adapted to fit into the socket of the cathode supporting portion of the electronic tube for imparting bending and tilting movement thereto, said shoulder being engageable with a portion of said electronic tube to limit the movement of the end portion of the metal tube into said socket, a plurality of discs of insulating material, means mounting said discs in spaced and coaxially aligned relation to each other, means for securing said metal tube to an end one of said discs, a rod of insulating material fixed to the other end one of said discs with the end portion of said rod forming a handle for said fixture, a circular member of insulating material extending transversely from said rod intermediate its ends to form a shield for said handle, a sheet of metal connectible to ground potential and secured to the side of said circular member directed towards the discs, and means including a connector element supported within the end of said metal tube in insulated relation thereto and engageable with one part of said electronic tube, said means being connectible to a testing apparatus for establishing an electrical connection between the apparatus and the electronic tube.

8. A fixture for adjusting the position of the cathode of an electronic tube during the testing thereof comprising a metal tube having an end portion thereof adapted to telescopingly fit into a socket of the cathode supporting portion of the tube for imparting bending and tilting movement thereto, a plurality of discs of insulating material, means mounting said discs in coaxially aligned and axially spaced relation to each other, means for securing said tube to an end one of said discs in coaxial alignment therewith, a rod of insulating material fixed to the other end one of said discs in coaxial alignment therewith and with the end portion of said rod forming a handle for said fixture, an annular disc of insulating material on said rod intermediate its ends forming a shield for said handle, a disc of metal secured to the side of said annular disc directed toward said discs and connectible to ground potential, and a pair of connector members mounted for movement with said discs in insulated relation to each other and connectible to portions of said electronic tube and to a testing apparatus for connecting the cathode of said electronic tube to said testing apparatus.

References Cited in the file of this patent

UNITED STATES PATENTS 2,641,630   Goldberger et al. _____ June 3, 1953